May 5, 1953            A. J. TALAMINI, JR            2,637,816

SQUARE WAVE VOLTAGE CALIBRATOR

Filed June 23, 1949

INVENTOR.
ARTHUR J. TALAMINI, JR
BY Darby & Darby
Attorneys

Patented May 5, 1953

2,637,816

UNITED STATES PATENT OFFICE 2,637,816

SQUARE WAVE VOLTAGE CALIBRATOR

Arthur J. Talamini, Jr., Caldwell Township, Essex County, N. J., assignor to Allen B. Du Mont Laboratories, Inc., Passaic, N. J., a corporation of Delaware Application June 23, 1949, Serial No. 100,923

1 Claim. (Cl. 250—36)

This invention relates to an electrical voltage calibrating method and apparatus and particularly to a method and apparatus for measuring peak values of a voltage of square wave form.

It is often desirable to determine accurately the peak value of a square wave voltage. One such application is that of calibrating the excursions of the beam of a cathode ray oscillograph.

It is an object of this invention to provide a method and apparatus for measuring peak values of a voltage of square wave form.

Another object is to provide a method and apparatus for obtaining a calibrating voltage that may be used to calibrate the excursions of the beam of a cathode ray oscillograph.

Other objects are to provide means for accurately adjusting the value of a calibrating voltage, and to provide a calibrating voltage in a form which will be clearly distinguishable on the screen of the cathode ray oscillograph and to achieve this result with a minimum of components.

The invention may be understood from the description in connection with the accompanying drawing, in which—

In practicing the invention, a free running multivibrator is used to generate square wave pulses of voltage. The essentially square wave output from the multivibrator will have positive going portions equal in duration to negative going portions. Under such conditions the multivibrator is considered to have a duty cycle of 50%. The average voltage value will be exactly one-half that of the peak value of the pulses and it can be accurately measured by a D. C. voltmeter.

Figure 1:
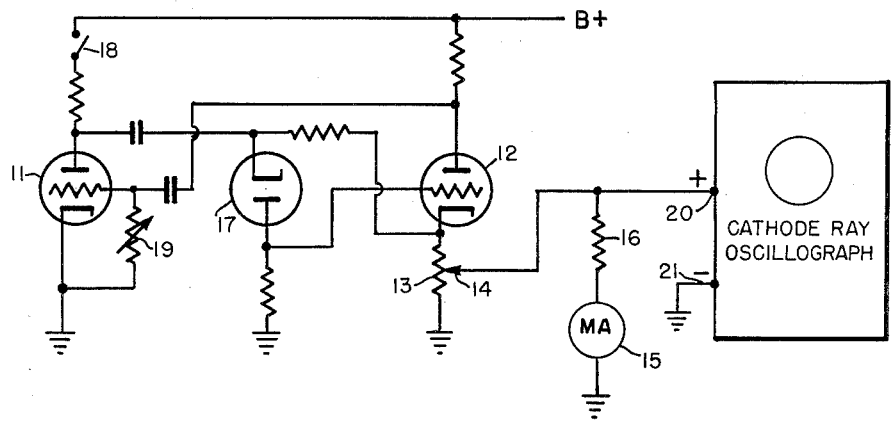
Figure 1 is a circuit diagram of the apparatus for practicing a preferred form of the invention.

Referring to Figure 1, two vacuum tubes 11 and 12 are connected in the well known manner as a free running multivibrator. The output square wave pulses are taken from the cathode resistor 13 of tube 12 by means of a sliding contact 14.

A milliammeter 15 connected in series with a resistor 16 is connected between the sliding contact and ground so as to be across a portion of the cathode resistor 13. This meter 15 may be calibrated to indicate volts. A switch 18 is connected in the plate supply lead of the tube 11 to cut off the oscillation when desired while permitting tube 12 to conduct.

The diode 17 is used to prevent the grid of tube 12 from being driven postive at the start of the square wave thus putting a high overshoot on the leading edge which would destroy the fidelity of a true square wave. A variable resistor 19 connected between the grid and cathode of tube 11 provides adjusting means for controlling the duration of the square wave pulse output.

The operation is as follows: The multivibrator operates in a normal fashion at a frequency which may be, for instance, approximately two hundred cycles. The square wave output of the multivibrator taken from the cathode resistor 13 of the tube 12 is adjustable by means of the sliding contact 14. The switch 18 is then opened so that oscillations cease and tube 12 is continuously conducting. The contact 14 may be set so that the meter 15 reads D. C. voltage, preferably full scale. Thereafter the switch 18 is closed and the multivibrator resumes oscillation. The resistor 19 is adjusted so that the meter 15 reads half scale or half the first reading at which point the duty cycle is 50% and the average voltage is one-half peak voltage. By using calibrated resistance associated with the meter 15, and a suitable scale, as well known by those skilled in the art, the meter may be read in terms of peak voltage. For instance, if the full scale D. C. voltage reading was 10 volts, the 5 volts indication of the half scale reading is an accurate determination of the peak value of the square wave voltage.

The voltage output may be applied to an oscillograph, for instance, through the terminals 20 and 21 in the usual way as an accurately calibrated voltage.

Figure 2:
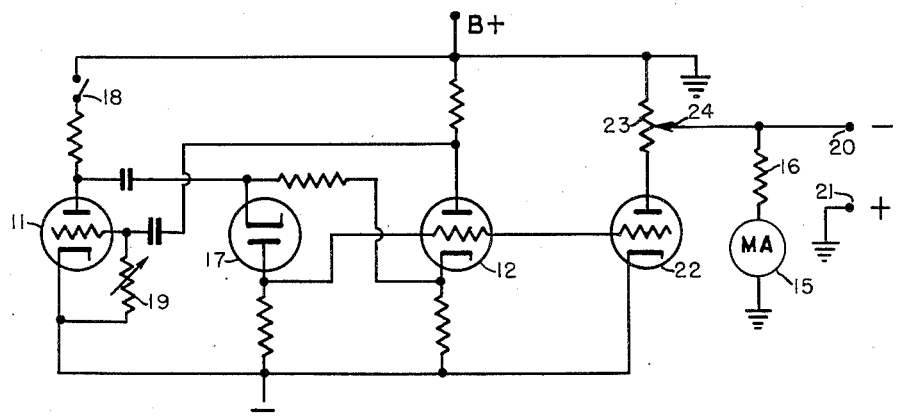
Figure 2 is a circuit diagram of a modification wherein an amplifier is added for higher calibrating voltages.

The modification shown in Figure 2 operates the same as the circuit shown in Figure 1, except that the grid of an amplifier tube 22 is connected to the grid of tube 12 and the output is taken from the plate load resistor 23 of tube 22 by means of sliding contact 24, the plate supply being operated with its positive terminal grounded. In the operation of this embodiment, the adjustments are the same as explained above in connection with Figure 1.

Figure 3:
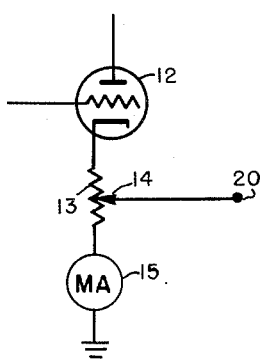
Figure 3 illustrates another modification.

While the meter 15 has been disclosed in the preferred arrangement connected to operate as a voltmeter, it may be inserted in the cathode lead of tube 12 as shown in Figure 3. If used in this way it becomes part of the cathode resistor and the resistor 13 must be accurately calibrated to permit direct current readings and voltage determination.

While preferred embodiments have been specifically described for calibrating a cathode ray oscillograph, modifications may be apparent to those skilled in the art without departing from the scope of the invention.

What I claim is:

A voltage calibration circuit comprising two thermionic tubes connected as a free running multivibrator, a switch in the anode power supply circuit in the first of said tubes to activate and deactivate selectively oscillations of said multivibrator, the second of said tubes being connected to continue to conduct when said switch has deactivated said oscillations, a D. C. meter connected to the output of the second of said tubes, a variable time constant circuit in said multivibrator to adjust the duty cycle thereof, a rectifier connected in series between the anode of the first of said tubes and the grid of the second of said tubes to control the voltage feedback of each thereof and a potentiometer connected to the second of said tubes to vary the amplitude of the output of said multivibrator while maintaining the duty cycle thereof.

ARTHUR J. TALAMINI, Jr.

References Cited in the file of this patent

UNITED STATES PATENTS

| Number | Name | Date |
|---|---|---|
| 1,363,267 | Porter | Dec. 28, 1920 |
| 2,221,833 | Cory | Nov. 19, 1940 |
| 2,254,031 | Faudell | Aug. 26, 1941 |
| 2,412,111 | Wilson | Dec. 3, 1946 |
| 2,428,021 | Grieg | Sept. 30, 1947 |
| 2,502,637 | Weiner | Apr. 4, 1950 |
| 2,548,276 | Weisbecker | Apr. 10, 1951 |
| 2,556,934 | Mulligan, Jr., et al. | June 12, 1951 |

FOREIGN PATENTS

| Number | Country | Date |
|---|---|---|
| 528,806 | Great Britain | Nov. 7, 1940 |
| 587,940 | Great Britain | May 9, 1947 |

OTHER REFERENCES

Publication I, "A Trigger Peak Voltmeter Using Hard Valves," A. T. Starr, The Wireless Engineer, November 1935, pp. 601–606. (Copy in Scientific Library.)

Publication II, "A New Oscillograph Accessory for Direct Measurement of Signal Amplitude," G. Robert Mezger, The Oscillographer, vol. 9, No. 2, March-April 1947, pp. 1 and 2.